No. 791,170. Patented May 30, 1905.

UNITED STATES PATENT OFFICE.

JAMES VERNON, OF NEWTON STEWART, SCOTLAND.

MANUFACTURE OF STEEL.

SPECIFICATION forming part of Letters Patent No. 791,170, dated May 30, 1905.

Application filed January 12, 1904. Serial No. 188,768.

*To all whom it may concern:*

Be it known that I, JAMES VERNON, a subject of the King of Great Britain, and a resident of Albert street, Newton Stewart, Scotland, have invented certain new and useful Improvements Relating to the Manufacture of Steel, of which the following is a specification.

The object of the present invention is to improve the quality of steel for manufacturing purposes by eliminating certain of the impurities which create blow-holes in the manufactured product and otherwise impair the density and ductility of the metal.

In carrying out my invention I follow the most approved methods of producing a finished steel, making use of an admixture of other metals, such as ferromanganese and aluminium, as well as of silicon, which are all recognized as useful additions for improving the quality of the metal. Furthermore, I employ other substances which act partly chemically and partly mechanically on the phosphorus, sulfur, and other impurities, which at present are a source of trouble in steel manufacture.

In manufacturing according to my invention I prefer to proceed in the following manner: The steel is prepared in the ordinary way in as pure a condition as possible and the mixture or "physic" composed of the ingredients hereinafter mentioned is put into the ladle before the molten metal. The physic contains, in the condition of fine powder, ferromanganese and aluminium, as before mentioned, and refined silicious cullet, obtained either from native rock-crystal or from coarse glass, which is comparatively free from lead and other metallic impurities. The cullet will yield silicon and in melting will act mechanically upon the molten mass, besides increasing somewhat the temperature thereof. Other ingredients of the mixture are porous earth of a clayey or loamy nature and what is known in the industrial arts as "kelp"—viz., the calcined ashes of seaweed. The former, from its comparative lightness, will have a tendency to rise through the molten mass, thereby providing an escape for the occluded gases, which, if they remain in the metal, are the cause of the blow-holes. The kelp, properly dried and ground, contains sodium, potassium, carbon, and iodin and has the effect of decomposing the phosphorus and sulfur, which can then escape in the form of vapor.

The ingredients of the mixture are ground up into a fine powder and in suitable quantities are placed in the ladle before the steel is tapped into it.

The proportions of the ingredients and the quantity of the mixture must of necessity vary according to circumstances, such as the character of the steel under treatment and the quality to be produced. I may, however, give the following proportions as having been satisfactorily employed in the production of a mild steel suitable for making small general castings in chills: To every one hundred and twelve pounds of steel, ferromanganese, one pound; pure aluminium, one-half ounce; cullet, one-half ounce; porous earth, one and one-fourth ounces; kelp, three-fourths ounce; total, one pound three ounces.

When the steel is tapped into the ladle containing the powder, a slight stir is given to the contents, and the metal is immediately ready for casting.

What I claim as my invention, and desire to secure by Letters Patent, is—

1. In a process of manufacturing steel the introduction of a mixture containing cullet, porous earth and kelp into the steel in a molten state, as and for the purpose described.

2. In a process of manufacturing steel the introduction of a mixture of ferromanganese, aluminium, cullet, porous earth and kelp into the steel in a molten state, as and for the purpose described.

In testimony whereof I have signed my name to this specification in the presence of two subscribing witnesses.

JAMES VERNON.

Witnesses:
JOHN MUIRHEAD DAWSON,
ANDREW SMITH.